(12) United States Patent
Uto (10) Patent No.: US 8,163,211 B2
(45) Date of Patent: Apr. 24, 2012

(54) PANEL AND METHOD FOR MANUFACTURING THE SAME

(75) Inventor: Ryoji Uto, Tokyo (JP)

(73) Assignee: Caterpillar S.A.R.L., Geneva (CH)

( * ) Notice: Subject to any disclaimer, the term of this patent is extended or adjusted under 35 U.S.C. 154(b) by 615 days.

(21) Appl. No.: 11/997,335

(22) PCT Filed: Jun. 26, 2007

(86) PCT No.: PCT/JP2007/062742
§ 371 (c)(1),
(2), (4) Date: Jan. 30, 2008

(87) PCT Pub. No.: WO2008/087755
PCT Pub. Date: Jul. 24, 2008

(65) Prior Publication Data
US 2010/0104818 A1    Apr. 29, 2010

(30) Foreign Application Priority Data

Jan. 15, 2007  (JP) .................................. 2007-005524

(51) Int. Cl.
*B29C 65/00* (2006.01)
*B29C 44/04* (2006.01)
*B29C 67/00* (2006.01)
*B29D 22/00* (2006.01)

(52) U.S. Cl. ....... 264/46.5; 264/41; 264/45.1; 264/45.5; 264/45.6; 264/46.4; 264/46.6; 264/46.7; 264/46.9; 156/77; 156/78; 156/79; 428/36.5; 428/158; 428/304.4; 428/309.9

(58) Field of Classification Search .................... 156/79, 156/77, 78; 264/46.4, 46.5, 46.6, 46.7, 46.9, 264/41, 45.1, 45.5, 45.6; 428/36.5, 158, 428/304.4, 309.9
See application file for complete search history.

(56) References Cited

U.S. PATENT DOCUMENTS 4,378,395 A * 3/1983 Asoshina et al. ............. 428/158
(Continued)

FOREIGN PATENT DOCUMENTS

| JP | 61-191954 | 11/1986 |
|---|---|---|
| JP | 09228412 | 9/1997 |
| JP | 09228412 A | 9/1997 |

(Continued)

OTHER PUBLICATIONS

Extended European Search Report issued for corresponding European Patent Application No. 07767648.6 mailed on Dec 15, 2009.

*Primary Examiner* — Christina Johnson
*Assistant Examiner* — Atul P Khare
(74) *Attorney, Agent, or Firm* — McDermott Will & Emery LLP

(57) ABSTRACT

It is an object of the present invention to provide a panel capable of obtaining sufficient strength, weight reduction and sound absorbing performance. A space is formed by an inner thin plate fixed to the inner surface of an outer thin plate, and a foam material is filled in the space. The foam material is preferably a highly foamable rubber sound absorbing material. In the inner thin plate, a perimetrical side part and perimetrical edge part for forming the space, and a concave part for enhancing the strength of the panel are drawn to the side of the outer thin plate. The bottom faces of the perimetrical edge part and concave part of the inner thin plate are bonded to the outer thin plate using a thermosetting adhesive.

2 Claims, 5 Drawing Sheets (a)

(b)

(c)

U.S. PATENT DOCUMENTS

| | | | |
|---|---|---|---|
| 4,578,436 A * | 3/1986 | Umemoto et al. | 525/443 |
| 4,857,698 A * | 8/1989 | Perun | 219/121.71 |
| 4,873,045 A * | 10/1989 | Fujita et al. | 264/259 |
| 4,916,284 A * | 4/1990 | Petrick | 219/121.64 |
| 5,649,400 A | 7/1997 | Miwa | |
| 5,866,052 A * | 2/1999 | Muramatsu | 264/46.6 |
| 2004/0041429 A1* | 3/2004 | McLaren et al. | 296/57.1 |
| 2006/0006698 A1 | 1/2006 | Ishikawa et al. | |

FOREIGN PATENT DOCUMENTS

| | | |
|---|---|---|
| JP | 09302717 | 11/1997 |
| JP | 10258331 | 9/1998 |
| JP | 10258331 A * | 9/1998 |
| JP | 2001122052 | 5/2001 |
| JP | 2001301659 A | 10/2001 |
| WO | 2004013214 A1 | 2/2004 |

* cited by examiner

PANEL AND METHOD FOR MANUFACTURING THE SAME

This is a U.S. national phase application under 35 U.S.C. §371 of International Patent Application No. PCT/JP2007/062742 filed Jun. 26, 2007, and claims the benefit of Japanese Application No. 2007-005524, filed Jan. 15, 2007. The International Application has not been published at the time of this filing. The contents of these applications are incorporated herein in their entirety.

TECHNICAL FIELD

The present invention relates to a panel provided with a foam material and a method for manufacturing the same.

BACKGROUND ART

There has been a cover body structure obtained by welding an inner reinforcing plate having a concave part to an outer panel of construction machinery (for example, see Japanese Patent Application Laid-Open No. 09-228412 ("JP '412") (e.g., page 3, FIG. 7)).

There has been an engine cover having a sound insulating material or a sound absorbing material as a lining member attached to the inner side of a cover body in construction machinery (for example, see Japanese patent Publication No. 3457804 ("JP '804") (e.g., page 2, FIG. 1)).

In JP '412, the cover body structure becomes heavy in order to obtain sufficient strength using the inner reinforcing plate, and welding traces tend to appear on the outside. Also, neither sound insulating performance nor sound absorbing performance is sufficient.

In JP '804, the lining member such as the sound absorbing material is visible from the outside when opening the engine cover, creating an unattractive appearance and insufficient strength.

The present invention has been made in consideration of the above-mentioned problems, and it is an object of the present invention to provide a panel capable of obtaining sufficient strength, weight reduction and sound absorbing performance, and a method for manufacturing the panel.

SUMMARY OF THE INVENTION

The invention provides a panel including:
an outer thin plate;
an inner thin plate fixed to an inner surface of the outer thin plate and forming a space; and
a foam material filled in the space.

The invention according to the below description provides the panel according to the above description, wherein the inner thin plate is bonded to the outer thin plate.

The invention provides the panel according to the above, wherein the outer thin plate has a turned-up edge part which is a turned-up perimetrical edge part crimped to and bonded to the inner thin plate.

The invention provides the panel according to any of the above, wherein a plurality of foam materials are arranged in one space.

The invention provides the panel, further including:
a fitting base member fixed to an inner surface of an end edge part of the outer thin plate; and
a hinge welded to the fitting base member.

A method for manufacturing a panel including the steps of:
providing a non-foam material of a foamable filler on an outer thin plate;
fixing an inner thin plate forming a space corresponding to the non-foam material to the outer thin plate;
foaming the non-foam material by a baking coating heating device to fill the foam material in the space; and
finishing at least the baking coating of the outer thin plate by the baking coating heating device.

The method for manufacturing the panel further includes the steps of:
supplying a thermosetting adhesive between the outer thin plate and the inner thin plate; and
curing the adhesive by the baking coating heating device.

The method for manufacturing the panel further includes the steps of:
partially omitting the application of an adhesive when applying the adhesive onto a perimetrical edge part of the outer thin plate; and
turning up the entire perimetrical edge part of the outer thin plate and fixing the perimetrical edge part to the perimetrical edge part of the inner thin plate.

The method for manufacturing the panel, further includes the steps of:
drilling an inner hole in the inner thin plate; and
laser processing an outer hole to the outer thin plate in the inner hole.

According to the invention, a three-layer structure having the outer thin plate, the inner thin plate and the foam material filled in the space of the inner thin plate can provide sufficient strength and weight reduction and can provide sound absorbing performance by the foam material.

According to the invention, since the inner thin plate is bonded to the outer thin plate, the inner thin plate can be fixed more easily than welding, and the exposure of welding traces having a poor appearance on the outside can be prevented or reduced.

According to the invention, since the turned-up edge part formed by turning up the perimetrical edge part of the outer thin plate is crimped to and bonded to the inner thin plate, sufficient bonding strength between the outer thin plate and the inner thin plate can be secured by crimping strength and adhesive strength, and the sealing performance of a bonded part can be secured.

According to the invention, the economical foaming shape corresponding to the shape of the space can be obtained by the plurality of foam materials.

According to the invention, the fitting strength required for the hinge can be secured by welding the hinge to the end edge part of the outer thin plate via the fitting base member.

According to the invention, since the non-foam material of the foamable filler provided on the outer thin plate is foamed by the baking coating heating device to fill the foam material in the space of the inner thin plate, the non-foam material can be efficiently foamed in the baking coating. Thereby, the manufacturing efficiency can be enhanced and the baking coating heating device can be efficiently operated.

According to the invention the thermosetting adhesive can be efficiently cured upon baking coating by the baking coating heating device, and the non-foam material can be efficiently foamed. Thereby, the manufacturing efficiency can be enhanced, and the baking coating heating device can be efficiently operated.

According to the invention, air can be removed when the non-foam material of the foamable filler is foamed from the non-applied part of the adhesive by partially omitting the application of the adhesive when the adhesive is applied onto the perimetrical edge part of the outer thin plate, and a smooth foaming operation can be secured.

According to the invention, the outer hole having any shape can be easily opened in the outer thin plate in the inner hole by laser processing by drilling the inner hole in the inner thin plate.

BRIEF DESCRIPTION OF THE DRAWINGS

FIG. 3 is a sectional view showing an example of a method for manufacturing the panel; FIG. (a) shows a state where a non-foam material is provided on an outer thin plate; FIG. (b) shows a state where a non-foam material is foaming; FIG. (c) shows a state where the foam formation of a foam material is completed;

DETAILED DESCRIPTION OF THE INVENTION

Hereinafter, the present invention will be described in detail with reference to an embodiment shown in FIGS. 1 to 7.

Figure 4:
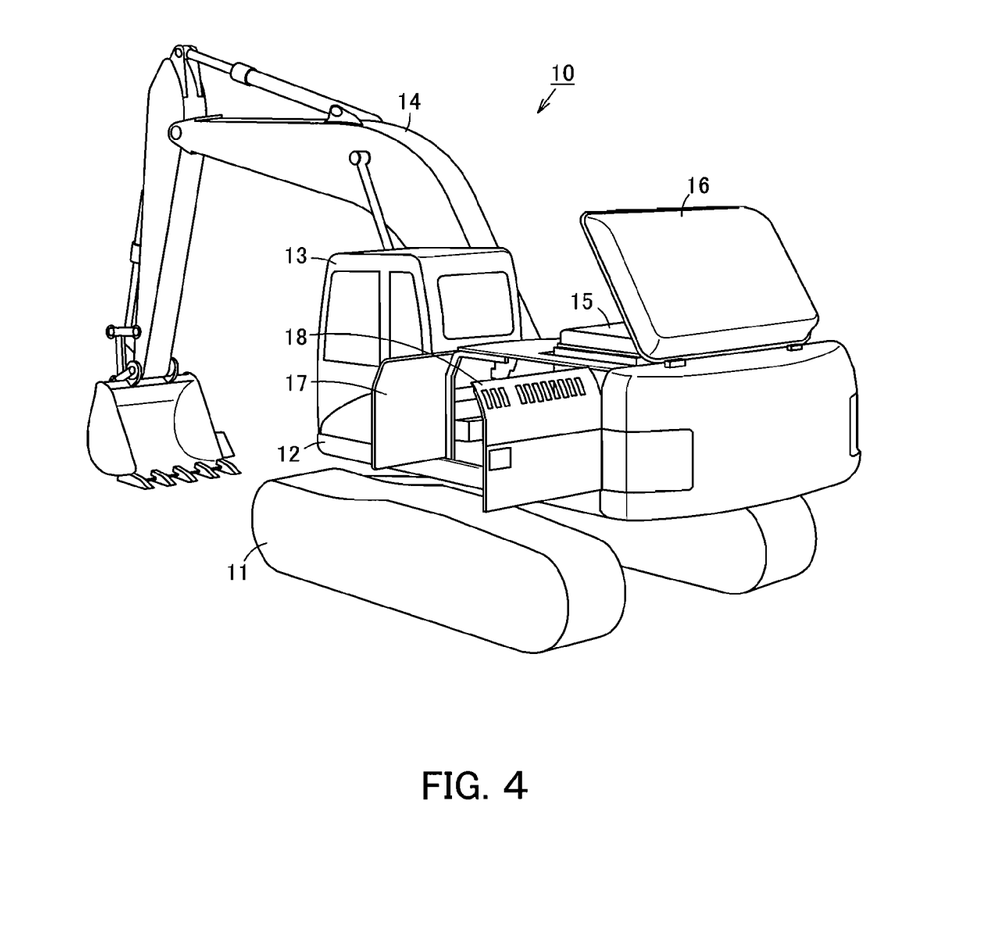
FIG. 4 is a perspective view of a hydraulic backhoe using the panel.
Figure 5:
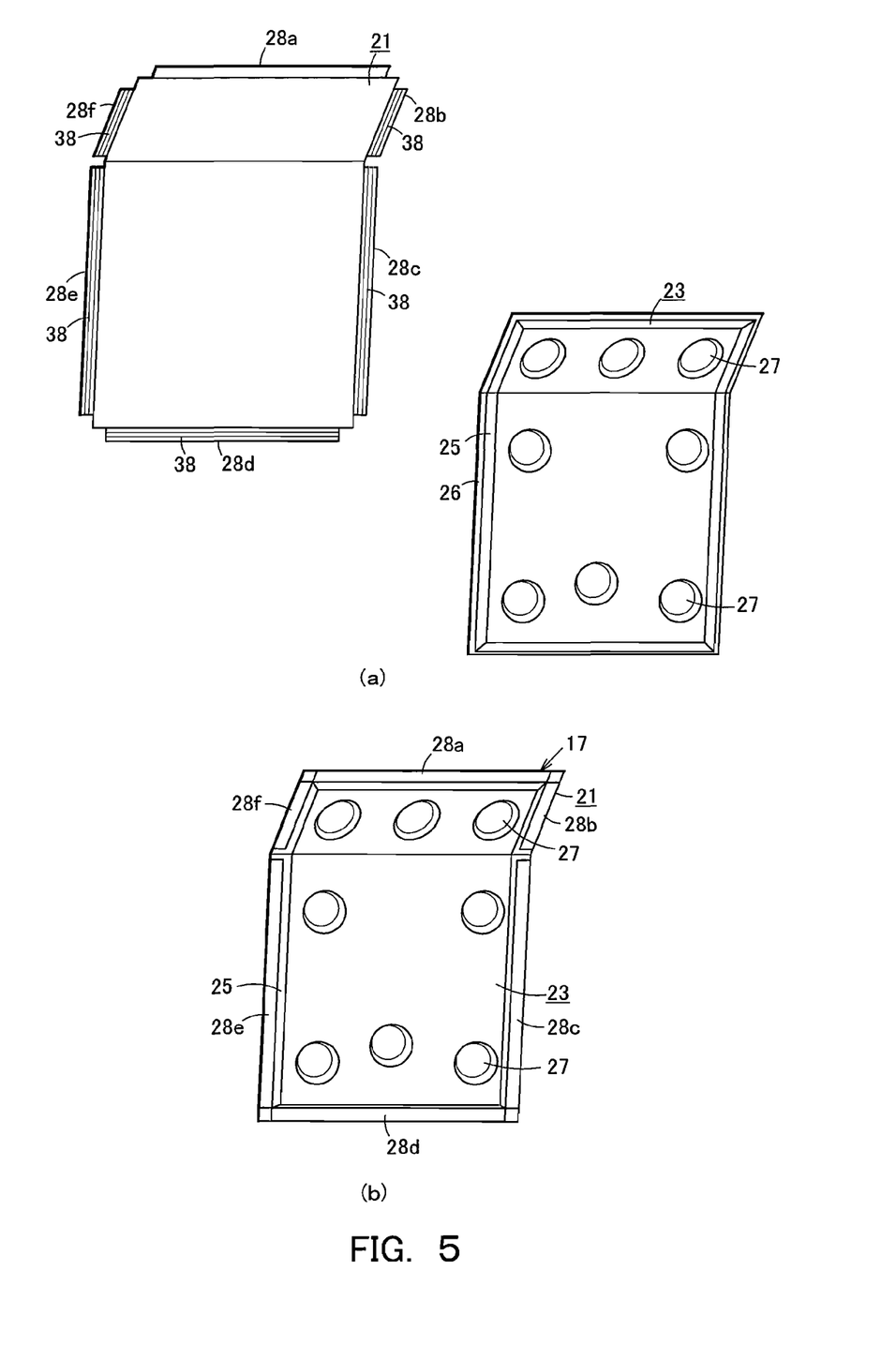
FIG. 5 is a perspective view showing an assembly example of an outer thin plate and inner thin plate which constitute the panel; FIG. (a) shows a disassembly state thereof; FIG. (b) shows an assembly completion state thereof.
Figure 6:
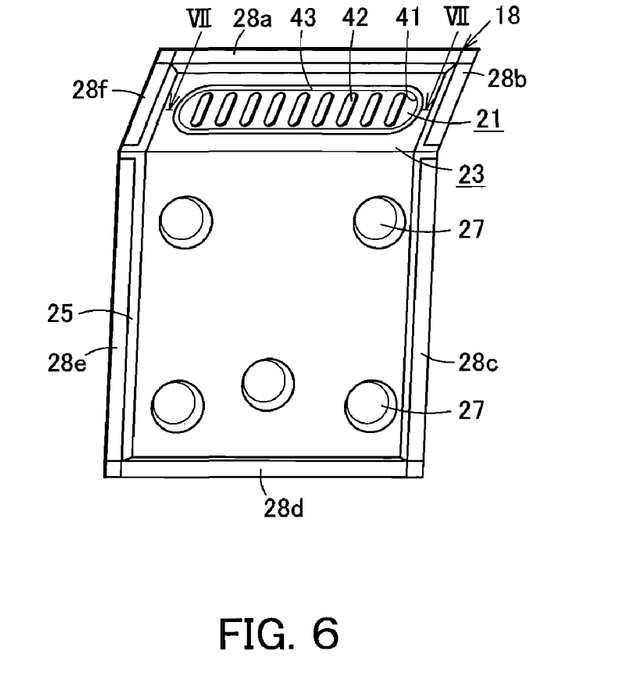
FIG. 6 is a perspective view showing a hole processing example of the panel.

As shown in FIG. 4, a hydraulic backhoe 10, which is an operating machine, includes a lower travelling body 11 and an upper turning body 12 turnably provided on the lower travelling body 11. On the upper turning body 12, there is mounted a cab 13, a working device 14, an engine 15, and an air filter and a radiator which are related to the engine 15, or the like. The engine 15 is covered with an engine hood 16, and the air filter and the radiator are covered with double swinging side door panels (hereinafter, simply referred to as panel) 17 and 18. FIG. 5 shows the air filter side panel 17. FIG. 6 shows the radiator side panel 18.

Figure 1:
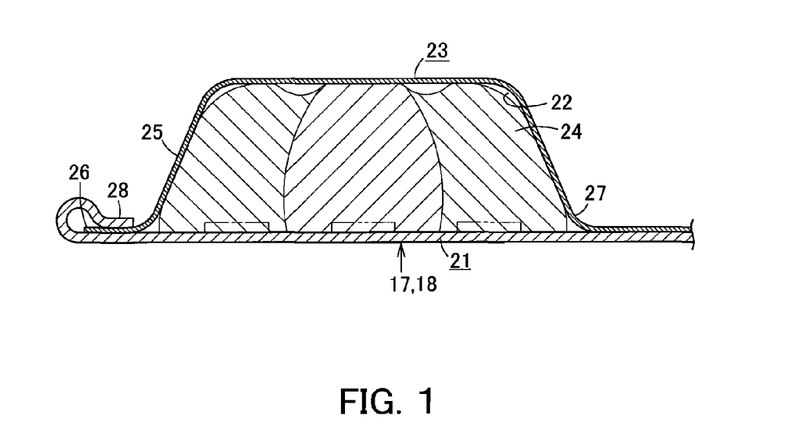
FIG. 1 is a sectional view showing an embodiment of a panel according to the present invention.

FIG. 1 shows a partially expanded view of the panels 17 and 18. Each of the panels 17 and 18 is provided with an outer thin plate 21, an inner thin plate 23 fixed to the inner surface of the outer thin plate 21 and forming a space 22, and a foam material 24 filled in the space 22. The foam material 24 is preferably a highly foamable rubber sound absorbing material having a volume expansion coefficient of about 20 times.

In the inner thin plate 23, a perimetrical side part 25 and a perimetrical edge part 26 for forming the space 22, and a concave part 27 for enhancing the strength of a panel are drawn to the side of the outer thin plate 21. The bottom faces of the perimetrical edge part 26 and concave part 27 of the inner thin plate 23 are bonded to the outer thin plate 21 using a thermosetting adhesive.

That is, the perimetrical side part 25, perimetrical edge part 26 and concave part 27 projected to the side of the outer thin plate 21 are formed in the inner thin plate 23 by a drawing process. Thereby, the space 22 is formed between the perimetrical side part 25 and the concave part 27 by bonding the bottom faces of the perimetrical edge part 26 and concave part 27 to the outer thin plate 21.

The concave part 27 bonded to the outer thin plate 21 can enhance the strength of the panel and reduce the volume of the space 22 between the outer thin plate 21 and the inner thin plate 23 to reduce the amount of the required foam material 24.

There is provided a turned-up edge part 28 formed by turning up the perimetrical edge part in the outer thin plate 21. The turned-up edge part 28 is crimped to the perimetrical edge part 26 of the inner thin plate 23, and is bonded by a thermosetting adhesive.

Figure 2:
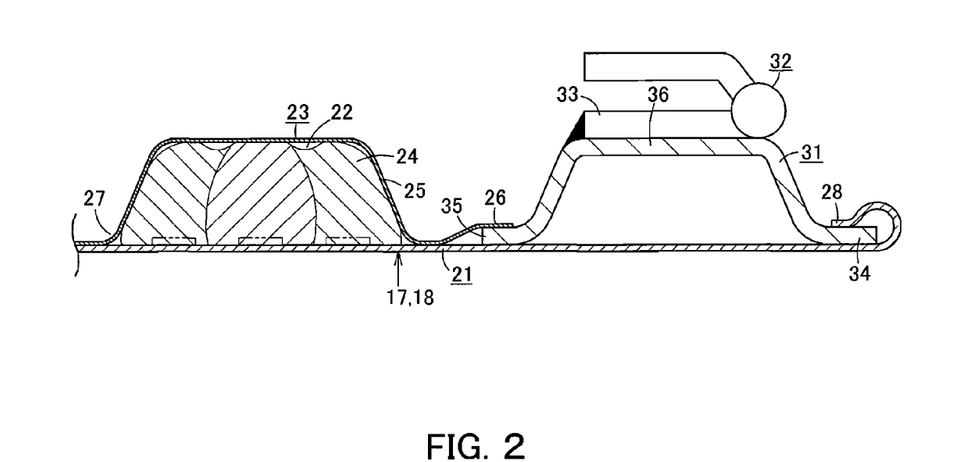
FIG. 2 is a sectional view of a hinge fitting part of the panel.

As shown in FIG. 2, referring to the panels 17 and 18, a thick plate-like fitting base member 31 is fixed to the inner surface of the end edge part of the outer thin plate 21 by a thermosetting adhesive. A fitting plate 33 of one side of a hinge 32 is welded to the fitting base member 31. That is, the strength of the circumference of the hinge 32 is mostly required, and must be reinforced, so that one leg part 34 and the other leg part 35 of the fitting base member 31 are bonded along the hinge fitting edge part of the outer thin plate 21, and the fitting plate 33 of the hinge 32 is welded to a plane-like fitting face part 36. The turned-up edge part 28 formed by turning up a side end edge part of the outer thin plate 21 is crimped to one leg part 34 of the fitting base member 31, and bonded by a thermosetting adhesive. The perimetrical edge part 26 of the inner thin plate 23 is stacked on the other leg part 35 of the fitting base member 31, and is bonded by a thermosetting adhesive.

Next, as shown in FIG. 3(a), referring to a method for manufacturing the panels 17 and 18, non-foam materials 24a of the foamable filler are provided on the outer thin plate 21. The inner thin plate 23 forming the space 22 corresponding to the non-foam materials 24a is fixed to the outer thin plate 21. At this time, a thermosetting adhesive is supplied between contact surfaces of the outer thin plate 21 and inner thin plate 23. The non-foam materials 24a are stuck on the outer thin plate 21 so that a plurality of rubber sound absorbing materials are arranged at a proper interval in one space 22.

The adhesive is cured by a baking coating heating device. Furthermore, as shown in FIGS. 3(b) and 3(c), the non-foam materials 24a are foamed by the baking coating heating device to fill the foam materials 24 in the space 22. Coating materials previously sprayed on the outer thin plate 21 and the inner thin plate 23 are baked by the baking coating heating device.

Figure 3:
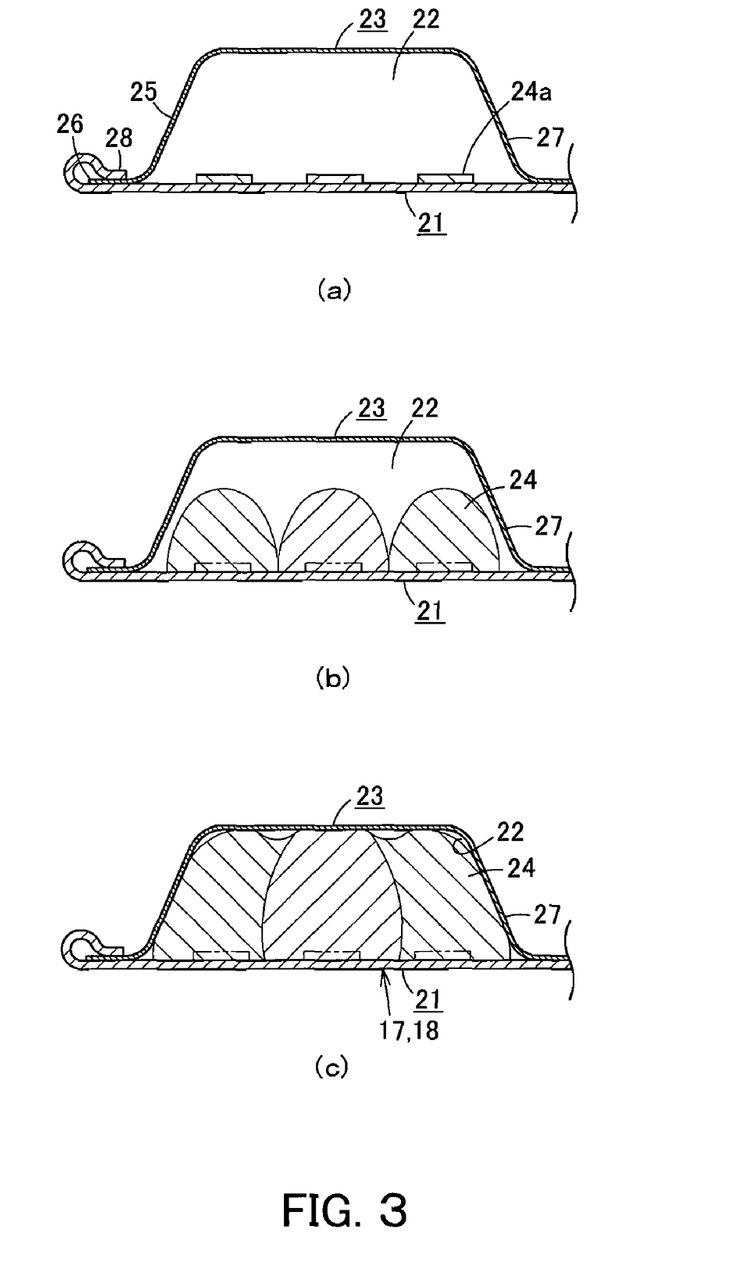

For example, it is necessary to heat the adhesive at 150° C. for 5 minutes in order to cure the adhesive; it is necessary to heat the foam material 24 at 180° C. for 20 minutes in order to complete the foam formation of the foam material 24; and baking heating at 200° C. for 20 minutes is required in order to complete the baking coating. Thereby, all the heatings can be performed by using the existing baking coating heating device.

In the manufacture of the panel 17 shown in FIG. 5(a), a thermosetting adhesive 38 is applied onto three perimetrical edge parts 28b, 28c, 28d, 28e and 28f of a right and left side edges and lower side edge among perimetrical edge parts 28a, 28b, 28c, 28d, 28e and 28f of the outer thin plate 21. As shown in FIG. 5(b), the entire perimetrical edge parts 28a to 28f of the outer thin plate 21 are turned-up without applying the thermosetting adhesive 38 onto the perimetrical edge part 28a of the upper side edge, and the perimetrical edge parts 28a to 28f are fixed to the perimetrical edge part of the inner thin plate 23.

That is, three side edges of the right and left side edges and lower side edge of the outer thin plate 21 are bent and bonded. However, only the upper side edge is bent, and is not bonded. Alternatively, the adhesive 38 may be intermittently applied in the form of perforations over the entire perimetrical edge part of the outer thin plate 21, or the adhesive 38 may be partially and intentionally removed. In short, when the adhesive 38 is applied onto the perimetrical edge part of the outer thin plate 21, the application of the adhesive 38 is partially omitted. On the other hand, the entire perimetrical edge part of the outer thin plate 21 is turned-up.

Figure 7:
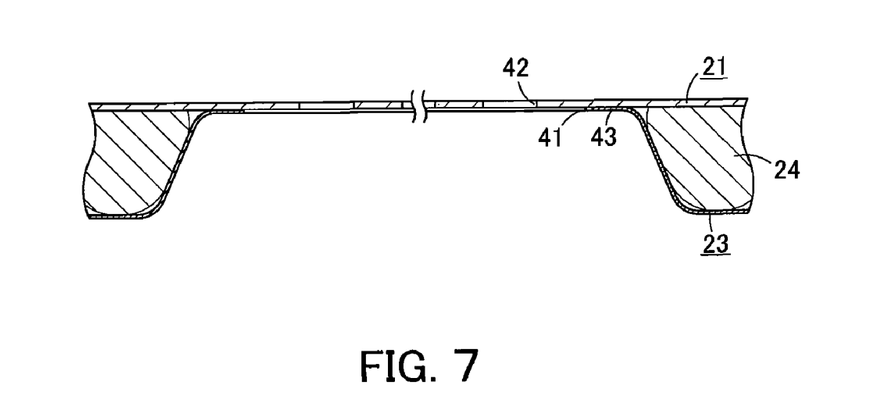
FIG. 7 is a cross section along the line VII-VII of FIG. 6.

The panel 18 shown in FIGS. 6 and 7 is also similarly bent and bonded. However, two metal plates cannot be simultaneously laser-processed when forming a hole in the panel 18 prepared by stacking two metal plates. Thereby, an inner hole 41 is drilled in the inner thin plate 23, and, a plurality of outer holes 42 are laser-processed and drilled in the outer thin plate 21 in the inner hole 41.

That is, it is technically difficult to form a hole in two layers of the outer thin plate 21 and inner thin plate 23 simultaneously by laser processing. Thereby, when the hole is formed in such a two-layer panel, the inner hole 41 is previously formed in a concave part 43 of the inner thin plate 23. The perimetrical edge part of the inner hole 41 is bonded to the outer thin plate 21, and the outer hole 42 having any shape is then opened in the outer thin plate 21 corresponding to an inner hollow part of the inner hole 41 by laser processing.

Next, the effects of the illustrated embodiment will be described.

As shown in FIG. 1, sufficient strength and weight reduction can be obtained by a three-layer structure of the outer thin plate 21, inner thin plate 23 and foam material 24 filled in the space 22 of the inner thin plate 23. That is, the foam material 24 is filled in the space 22 between the outer thin plate 21 and the inner thin plate 23, and they are wholly integrated. Thereby, the strength shortage of each of the outer thin plate 21 and inner thin plate 23 is compensated, and the strength can be enhanced as a whole.

The sound absorbing performance can be obtained by the foam material 24, and the sound absorbing material bonded to the inner surface of the side door panel of the conventional engine cover can be removed.

Since the inner thin plate 23 is bonded to the outer thin plate 21, the inner thin plate 23 is fixed more easily than welding, and the exposure of welding traces having a poor appearance on the outside can be prevented or reduced.

Since the turned-up edge part 28 formed by turning up the perimetrical edge part of the outer thin plate 21 is crimped to and bonded to the perimetrical edge part 26 of the inner thin plate 23, sufficient bond strength between the outer thin plate 21 and the inner thin plate 23 can be secured by crimping strength and adhesive strength, and the sealing performance of a bonded part can be secured.

The economical foaming shape corresponding to the shape of the space 22 can be obtained by the plurality of foam materials 24.

As shown in FIG. 2, the fitting strength required for the hinge 32 can be secured by welding the hinge 32 to the end edge part of the outer thin plate 21 via the fitting base member 31.

As shown in FIG. 3, since the non-foam material 24a of the foamable filler set on the outer thin plate 21 is foamed by the baking coating heating device to fill the foam material 24 in the space 22 of the inner thin plate 23, the non-foam material 24a can be efficiently foamed in the baking coating. Thereby, the manufacturing efficiency can be enhanced, and the baking coating heating device can be efficiently operated.

Furthermore, the thermosetting adhesive can be efficiently cured upon baking coating by the baking coating heating device, and the non-foam material 24a can be efficiently foamed. Thereby, the manufacturing efficiency can be enhanced, and the baking coating heating device can be efficiently operated.

As shown in FIG. 5, air can be removed when the non-foam material 24a of the foamable filler is foamed from the non-applied part of the adhesive 38 by intermittently applying the adhesive 38, and partially and intentionally removing the adhesive 38 to partially omit the application of the adhesive 38 when the adhesive 38 is applied onto the perimetrical edge part of the outer thin plate 21. Therefore, a smooth foaming operation can be secured, and the generation of problems of thin plate burst or the like in complete sealing can be prevented.

As shown in FIGS. 6 and 7, the outer hole 42 having any shape can be easily opened in the outer thin plate 21 in the inner hole 41 by laser processing by drilling the inner hole 41 in the inner thin plate 23.

In one example shown, referring to the side door panel used for a conventional hydraulic backhoe, a thick sheet metal having a thickness of 1.6 mm is further reinforced. On the other hand, as the outer thin plate 21, a thin sheet metal having a thickness of 0.8 to 1.2 mm is used, and as the inner thin plate 23, a thin sheet metal having a thickness of about 0.35 to 0.6 mm is used. The thin plates 21 and 23 are laminated using an adhesive. The thin plates 21 and 23 are sealed by the perimetrical edge part 28 formed by turning up the perimetrical edge part of the outer thin plate 21. The non-foam material 24a of a foamable rubber sound absorbing material is laminated on the inner surface of the outer thin plate 21 facing the space 22 between the thin plates 21 and 23 before laminating them. This non-foam material 24a is foamed in a heat process in baking the coating so that the material is filled in a part or all of the space 22. Since the foam material 24 has reinforcing effect and sound absorbing performance, even a large-sized panel can suppress the weight to attain weight reduction and can enhance sound insulating performance and strength. The panel can strengthen the rigidity of a door, can substantially realize a reduction in noise of a standard door, and has excellent appearance.

The present invention can be used for an opening/closing door panel, a non-opening/closing fixed panel, and a method for manufacturing the panels.

The invention claimed is:

1. A method for manufacturing a panel comprising the steps of:
    spraying a coating material onto an outer thin plate;
    providing a non-foam material of a foamable filler on the outer thin plate;
    providing an inner thin plate over the outer thin plate to form a space between the inner and outer plates, wherein the space contains the non-foam material;
    intermittently applying a thermosetting adhesive to a perimetrical edge part of the outer thin plate, wherein the adhesive is partially and intentionally removed from the perimetrical edge part;
    turning up the entire perimetrical edge part of the outer thin plate to fix the perimetrical edge part to a perimetrical edge part of the inner thin plate;
    placing the fixed assembly into a baking coating heating device to bake the coating material and foam the non-foam material so that it fills into the space;
    simultaneously curing the adhesive with the baking coating heating device; and
    releasing air contained in the space during foaming through omissions of the adhesive.

2. The method for manufacturing the panel according to claim 1, further comprising the steps of:
    drilling an inner hole in the inner thin plate; and
    laser processing an outer hole to the outer thin plate through the inner hole.

* * * * *

UNITED STATES PATENT AND TRADEMARK OFFICE
CERTIFICATE OF CORRECTION

PATENT NO. : 8,163,211 B2  
APPLICATION NO. : 11/997335  
DATED : April 24, 2012  
INVENTOR(S) : Ryoji Uto Page 1 of 1

It is certified that error appears in the above-identified patent and that said Letters Patent is hereby corrected as shown below:

Title Page, Column 2, (Foreign Patent Documents), lines 2-3, delete "JP   09228412       9/1997  
                                                                    JP   09228412 A   9/1997" and insert -- JP     09228412 A    9/1997 --.

Signed and Sealed this  
Twenty-ninth Day of September, 2015

Michelle K. Lee  
*Director of the United States Patent and Trademark Office*